United States Patent Office 3,589,951
Patented June 29, 1971

---

3,589,951
SOLID WELD BACKING-UP FLUX COMPOSITIONS
Masayasu Arikawa and Motomi Kano, Fujisawa-shi, and Hitosi Shioyama and Toshihiko Okamoto, Kamakura-shi, Japan, assignors to Kobe Steel Ltd., Kobe, Japan
Filed Mar. 2, 1967, Ser. No. 620,113
Claims priority, application Japan, Mar. 5, 1966, 41/13,432
Int. Cl. B23k 35/00
U.S. Cl. 148—24                    3 Claims

ABSTRACT OF THE DISCLOSURE

Solid weld backing-up flux composition for one side welding operation comprising the conventional principal flux components and additive metallic powder or powders which are bonded together by means of a bonding agent and having the apparent porosity within the range from 25 to 60%. Combinations of said solid weld backing-up flux composition and support means therefor for one side welding operation comprising the flux composition secured to a flexible sheet, sandwiched between fibrous sheets or received in a metallic casing with at least one area of the flux composition exposed.

BACKGROUND OF THE INVENTION

As consumable weld backing-up means for one side welding operation, hitherto, tape- and glass fiber-supported weld backing-up flux compositions, powdery iron powder- and resin-containing flux compositions and high fire-resistance powdery flux compositions have been proposed and actually employed. Although the tape-supported weld backing-up flux compositions and glass fiber-supported weld backing-up flux compositions as weld backing-up means for one side welding operation have advantages in that they can be used for welding work pieces having varying degrees of curvatures and are easy in handling or transporting, these weld backing-up means have inherent disadvantages in that they easily produce undercuts, weld fins, slag entanglements, unsatisfactory back bead appearances and so on. Therefore, unless these types of weld backing-up means are formed of specific flux compositions, they are not actually available for one side welding operations.

Powdery iron-containing flux compositions and high fire resistance powdery flux compositions cannot be employed for some applications in which on-the-field welding operations are performed or built structures are welded because of the natures of such flux compositions and the manner in which these flux compositions are employed; that is, since the powdery iron-containing flux compositions are employed in their powdery forms, even if the flux compositions are evenly placed in the grooves of copper made holders or supports there may be warty uneven spots on the surfaces of the formed beads. And when these flux compositions are employed for on-the-spot welding operations or for welding large structures, the powdery compositions may come loose to fall down or deficiency of such compositions at the connections of the copper holders or supports to the work pieces being welded together may occur to cause unsatisfactory bead formations. Since resin-containing flux compositions cannot be employed for one side welding operation purpose in such powdery forms because of their natures and the manner in which these flux compositions are employed, these flux compositions are usually employed by solidifying them through the utilization of their thermal setting properties. However, the procedure for heating such resin-containing compositions involves complicated steps, and furthermore, if they are not evenly heated, air voids appear in random fashions in the heat-setted flux compositions resulting in uneven back beads. Further, these resin-containing flux compositions cannot be employed for one side fillet welding operations.

SUMMARY OF THE INVENTION

The present invention relates to improved solid weld backing-up flux compositions for one side welding operation and combinations of such flux compositions and support means therefor, and more particularly, solid weld backing-up flux compositions and combinations of such solid weld backing-up flux compositions and support means therefor which are adapted to be applied against a first side of work pieces opposite a second side of the work pieces where metal is to be deposited so as to form a desired back bead on the first-mentioned side of the work pieces.

The present invention is to provide improved solid weld backing-up flux compositions and combinations of such flux compositions and support means therefor which are adapted to be employed for one side welding operation and which can be also satisfactorily employed for in-the-field welding operations, for welding large type structures and work pieces having complicated configurations.

BRIEF DESCRIPTION OF THE DRAWING

The above and other objects and advantages of the present invention will be more readily apparent from the following description.

DESCRIPTION OF THE PREFERRED EMBODIMENTS

Our experiments have shown that even if powdery components for flux compositions are solidified by means of a viscous bonding agent such as water glass, such solidified flux compositions are still very unsatisfactory as practical weld backing-up means because the welding results obtained by the use of such solidified weld backing-up flux compositions have shown that such defects as excessive back beads, insufficient back beads, undercuts, bead bulges and weld fins appear. And it has been found that mere solidification of flux components would not produce any practically usable weld backing-up flux composition. In other words, mere solidification of flux components only serves to change the powdery components into a solid state. Although such a solid flux composition may occasionally produce a satisfactory weld by chance, there is no positive assurance that the solid flux composition can always produce satisfactory welds without fail.

In preparing any solid flux composition, the blending ratios and grain sizes of components, the type and amount of a bonding agent such as water glass, the molding pressure of the bonded components, and the temperature and time period for molding the product should be suitably selected in relation to some specific failure resistance, anti-hygroscopicity to be imparted to the weld intended and the properties of the back bead to be produced. Furthermore, the physical properties, heat conductivity, fire resistance and porosity of a specific solid flux composition in use are important factors which have influence on the utility of such a flux composition as a weld backing-up material and these factors are important requirements which should be considered in determining the practicability of such a flux composition as a weld backing-up material.

The present invention is based on the discovery that if conventional flux components are added thereto one or more types of metallic powder or powders within a specific range of amount and these principal flux components and metallic powder or powders are bonded together by means of a bonding agent such as water glass within a specific range of amount followed by a molding step under pressure, a flux composition possessing excellent properties as a solid weld backing-up flux composition can be obtained.

One object of the present invention is to provide a solid weld backing-up flux composition comprising conventional principal flux components and one or more types of metallic powder or powders within the range from 5 to 75% which are bonded together by means of a conventional bonding agent such as water glass and molded under pressure and having the apparent porosity within the range from 25 to 60% as expressed by:

$$\frac{W_1 - W_3}{W_1 - W_2} \times 100$$

wherein $W_1$ is the weight of the flux composition in the air containing moisture therein, $W_2$ is the weight of the flux composition in water and $W_3$ is the dry weight of the flux composition.

Another object of the present invention is to provide a combination of said solid weld backing-up flux composition and a desired cross-section metallic casing which receives the solid composition therein with at least one area of said solid composition exposed to the atmosphere.

Another object of the present invention is to provide a combination of a plurality of blocks of said solid weld backing-up flux composition and a support sheet which fixedly supports on one side said composition blocks side by side.

A further object of the present invention is to provide a combination of said solid weld backing-up flux composition and one or more pairs of glass fiber sheets which sandwich the solid flux composition between adjacent ones.

The principal powdery flux components which constitute the principal materials of any of the solid weld backing-up flux compositions embodying the present invention are powders of those which are conventionally employed in the art, for example, such principal flux constituting powdery materials include those selected from inorganic oxides such as silicon dioxide, aluminum oxide, calcium oxide, magnesium oxide, manganese oxide and barium oxide or minerals containing these inorganic oxides; metallic carbonates such as barium carbonate, calcium carbonate and magnesium carbonate or minerals containing these metallic carbonates; inorganic fluoride such as calcium fluoride or minerals containing inorganic fluorides. According to the conventional process for preparing a solid weld backing-up flux composition from the above-mentioned component materials, selected materials are bonded together in a suitable ratio by means of a suitable bonding agent according to the conventional manner known in the art and the thus bonded materials are then subject to a further solidifying step so as to form a fused type, sintered type or semi-sintered type solid flux composition.

Figures 1, 2, 3:
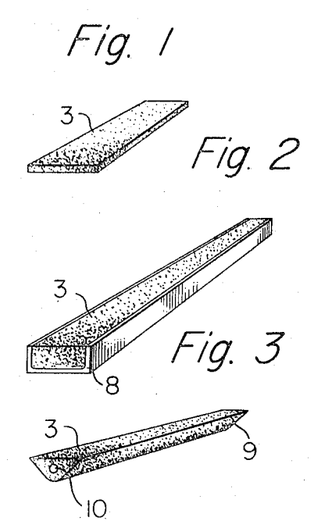
FIGS. 1 through 3 are perspective views of different embodiments of the present invention, respectively.
Figure 4:
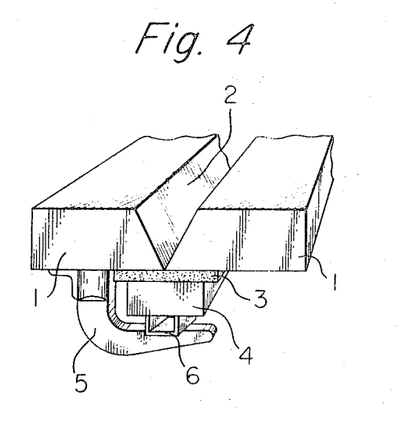
FIG. 4 is a fragmentary perspective view illustrating an actual one side welding operation being performed on work pieces employing the solid weld backing-up flux composition shown in FIG. 1.
Figure 5:
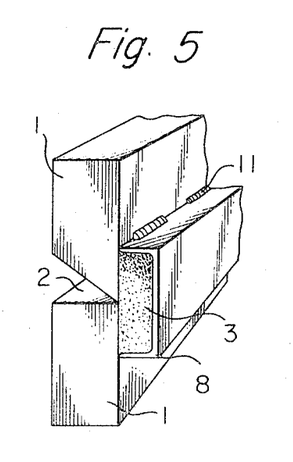
FIG. 5 is a fragmentary perspective view illustrating an actual one side welding operation being performed on work pieces employing the combination of solid weld backing-up flux composition and metallic casing shown in FIG. 2.
Figure 6:
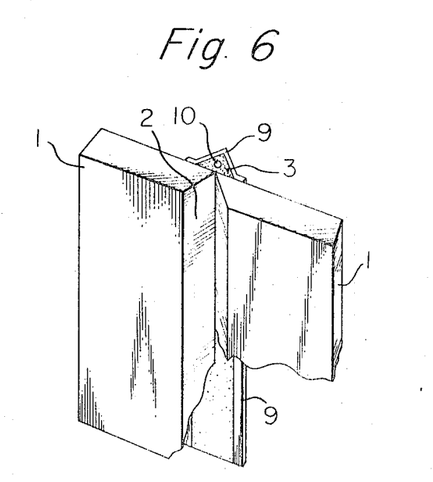
FIG. 6 is a fragmentary perspective view illustrating an actual one side welding operation being performed on work pieces employing the combination of solid weld backing-up flux composition and a modified metallic casing shown in FIG 3.

According to the present invention, however, in addition to the above-mentioned principal flux constituting components, any of the novel solid weld backing-up compositions further comprise metallic powder or powders selected from powders of deoxidizing metallic elements such as aluminum and titanium or alloys containing these deoxidizing metallic elements; chrome group, titanium group, vanadium group; metallic elements as alloying materials such as manganese and nickel or alloys containing these alloying materials; and iron (including iron oxide) or iron alloy. For bonding these principal flux components and metallic powders together, silicate such as water glass in a small amount is preferable, but other bonding agents such as linseed oil, powdered bentonite, clays or polyethylene may be equally employed in a small amount. The principal flux components and metallic powder or powders are molded into any desired shape under pressure employing one of the above-mentioned bonding agents so as to provide a novel solid weld backing-up flux composition. The weld backing-up flux composition may be molded into various shapes depending upon the conditions under which the weld backing-up flux composition is used. FIGS. 1 through 3 illustrate three different types of shapes which may be given to the novel weld backing-up flux composition. FIG. 4 illustrates a typical one side plan welding operation employing the flat plate-shaped bared solid weld backing-up flux composition 3 shown in FIG. 1. In carrying out the one side welding operation employing the flat-plate-shaped bare solid weld backing-up flux composition 3, the solid backing-up composition 3 is first positioned on the under-surface of work pieces 1 to be welded together such as steel plates covering the bottom of the beveling 2 defined by the opposite beveled ends of the work pieces and firmly held against the under-surfaces of the work pieces 1 by means of a clamp 5 with a cooling metallic plate 4 and a wedge 6 which are disposed one upon the other interposed between the solid backing-up flux compositions 3 and clamp 5. FIG. 5 illustrates another example of one side horizontal welding operation employing the combination of the solid weld backing-up flux composition 3 identical with that of FIGS. 1 and 4 and an elongated metallic casing 8 having the open top and receiving the flux composition therein with the top of the composition exposed to the atmosphere. In FIG. 5, the encased solid weld backing-up flux composition is shown as being applied against the back surfaces of work pieces 1 to be welded together covering the bottom of the beveling 2 between the work pieces in a one side horizontal welding operation. In this case, prior to initiation of the welding operation proper, the metallic casing 8 containing the solid weld backing-up flux composition 3 therein may be temporally tack-welded to the back surfaces of the work pieces 1 as shown at 11 is in figure. FIG. 6 illustrates an example of one side vertical welding operation employing the solid weld backing-up flux composition 3 received in an angle-shaped metallic casing 9 having one open side (the top side in FIG. 3) so as to expose one side of the flux composition to the atmosphere and an embedded reinforcing steel wire 10 which extends along the longitudinal axis of the steel casing 12. In FIG. 6, the solid weld backing-up flux composition 3 contained in the metallic casing 9 is shown as being held against the back surfaces of work pieces 1 covering the back side of the beveling 2 between the vertically and oppositely arranged work pieces by an suitable means such as by tack-welding of the free edges of the opposite arms of the casing 9 to the work pieces with the exposed side of the composition abutting against the work pieces.

Figures 9, 12:
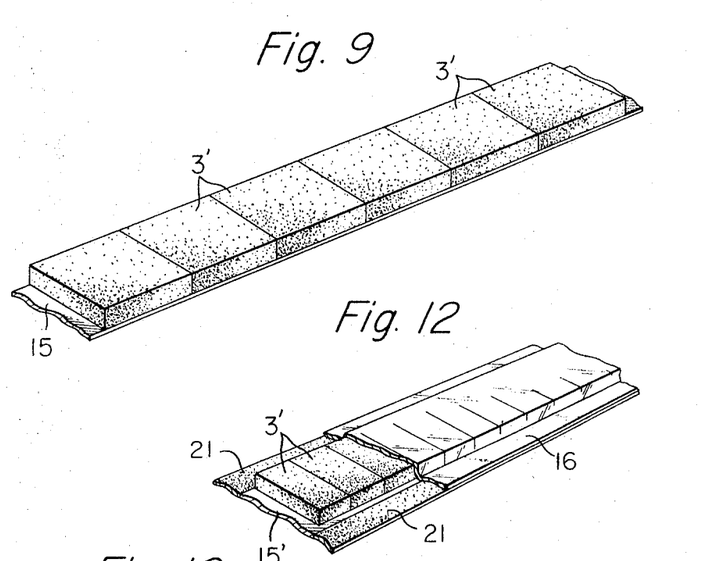
FIG. 9 is a fragmentary perspective view of a flexible sheet-supported type solid weld backing-up flux composition embodying the present invention.
FIG. 12 is a fragmentary perspective view of a modified form of flexible sheet-supported type solid weld backing-up flux composition embodying the present invention.

FIG. 9 illustrates a flexible sheet-supported type solid weld backing-up flux composition embodying the present invention and as shown in this figure, the flexible sheet-supported type embodiment comprises a flexible strip 15 and a number of solid flux composition blocks 3' arranged side by side on one side of the strip 15 (the top side in FIG. 9) along the length thereof and secured to the sheet side by means such as rubber cement, resinous cement, glue or water glass. The flexible strip 15 may be formed of a length of metallic foil such as aluminum, kraft paper, glass fiber, cloth or plastic film such as polypropylene film. The solid weld backing-up flux composition blocks 3' may be formed of the principal flux components and components and metallic powder or powders which are bonded together as mentioned above or any other conventional fusible welding flux composition depending upon the conditions under which the strip-supported embodiment is employed.

To give one suitable example of dimensions of the flexible strip 15 for the embodiment of FIG. 9, the flexible sheet 15 preferably has a thickness from 2 to 10 mm., the width from 20 to 60 mm. and the length of at least 10 mm. The width of the strip 15 is substantially the same as that of each flux composition block 3'.

Figure 10:
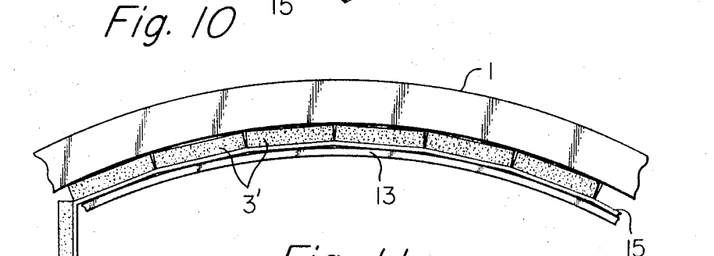
FIG. 10 is a fragmentary side elevational view illustrating the sheet-supporting type weld backing-up flux composition of FIG. 9 as actually employed in a one side welding operation.
Figure 11:
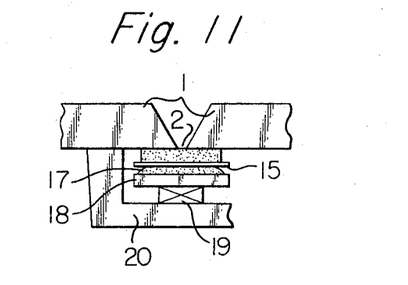
FIG. 11 is an end elevational view of the sheet-supported type weld backing-up flux composition as employed in the operation shown in FIG. 10.

FIGS. 10 and 11 illustrate an example of one side welding operation to be carried out on structural components of a ship such as curved external, round gunwales and cambers employing the flexible strip-supported type embodiment of FIG. 9. In such a mode of operation as shown in FIGS. 10 and 11, the flexible strip 15 supporting the flux composition blocks 3' thereon is held against the under-surfaces of curved steel work pieces 1 covering the bottom of the beveling 2 between the work pieces with the non-supported surfaces of the flux composition blocks 3' abutting against the work piece under-surfaces and a copper hoop 13 is firmly applied against the entire undersurface of the strip 15 (FIG. 10) or an iron hoop 18 with a heat-resistance film 17 applied on one side is firmly held against the entire under-surface of the strip 15 to support the strip 15 from below. The copper hoop 13 or iron hoop 18 may be held in position by means of a cantilever-like piece 20 with a wedge 19 interposed between the hoop and cantilever-like piece. The cantilever-like piece 20 is suitably secured at one end to the under-surface of one of the work pieces 1 to be welded together. With the strip supported flux composition blocks 3' positioned as mentioned above, the desired one-side welding operation can be initiated. As the welding operation proceeds, the upper surfaces of the individual flux composition blocks 3' melt away so as to control the shape of a back bead formed at the bottom of the weld and hold the back bead up. Therefore, when the solid composition blocks 3 have a high fusing point, even if the above-mentioned copper hoop 13 or iron hoop 18 is eliminated, the flexible sheet 15 itself can support the molten metal, and in which a case the strip 15 supporting the flux composition blocks 3' thereon can be easily and simply secured to the under-surfaces of the work pieces by means of, for example, a suitable adhesive tape.

Up to date, a great variety of solid weld backing-up flux compositions for one side welding have been marketed and publicly known through various publications, but no practical solid weld backing-up flux compositions which could be satisfactorily employed for work pieces having varying degrees of curvatures have been developed.

However, in the above-mentioned flexible strip-supported type embodiment according to the present invention, since a number of welding flux composition blocks 3' are in series arranged on and secured to one side of the flexible strip 15, the sheet-supported flux composition blocks 3' can flex along the entire length of the strip 15. When the novel flexible strip-supported embodiment is used in an actual one side welding operation, the same can be cut to a desired length and applied against the under-surfaces or back surfaces of work pieces to be welded together and held in position by the suitable means as mentioned above. Therefore, the strip-supported type embodiment may be easily and uniformly applied against curved or bent work pieces having varying dimensions and configurations. Furthermore, individual flux composition blocks 3' can be secured to one side of the flexible strip 15 in such a manner that they can satisfactorily accommodate the flexing of the strip and provide satisfactory and positive back bead backing-up effects.

FIG. 12 illustrates a modified form of flexible strip-supported type embodiment according to the present invention, and in this modified form, the flexible strip 15' is formed wider than the strip 15 of FIGS. 9 through 11 and accordingly, the opposite longitudinal edges 16 of the strip 15' extend beyond the adjacent ends of individual flux composition blocks 3' having the same dimensions as those of the blocks 3' of FIG. 9 and suitable adhesive material 21 is applied on the upper surface of the extended edges of the strip 15' for attachment to the under-surfaces or back surfaces of the work pieces to be welded together. In this modified embodiment of FIG. 12, the upper surface of the solid flux composition blocks 3' is normally covered with a continuous strip of film 16 formed of suitable material during storage of the strip-supported type embodiment with the opposite longitudinal edges of the film adhered to the opposite longitudinal edges of the strip 15' and when the embodiment is used for a one side welding operation the covering film 16 is removed from the flux composition blocks 3'.

Figure 13:
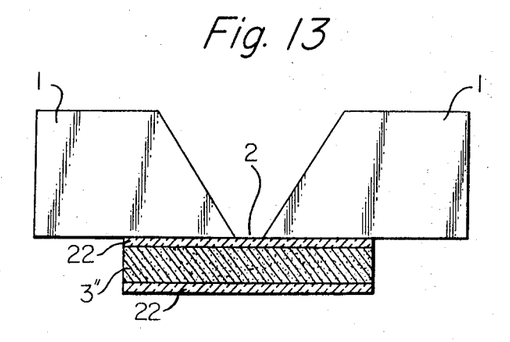
FIG. 13 is a cross-sectional view of a sandwiched type solid weld backing-up flux composition embodying the present invention illustrating the solid composition as actually employed in a one side welding operation.

FIG. 13 illustrates a simple layered-type or sandwich type solid weld backing-up flux composition according to the present invention and as shown in this figure, the layered-type solid weld backing-up flux composition comprising a solidified flux block 3" sandwiched between upper and lower glass fiber sheets 22 which cover at least the opposite sides of the flux block 3". The flux block 3" is prepared by mixing conventional powdery materials selected from metallic oxides such as silica, rutile, alumina and magnesia; metallic carbonates such as limestone and dolomite; fluoride such as fluorite; iron powder and iron alloy powder in proper ratios. The selection of these component materials and mixing ratios thereof may be determined depending upon the conditions under which a one side welding operation is carried out. The above-mentioned flux components may be bonded together by one of any suitable known bonding agents which can solidify the powdery components and one suitable boding agent for the purpose is water glass. The glass fiber sheets 22 may be formed by weaving glass fibers or sheeting glass fibers instead of weaving to a desired thickness in accordance with any known process. To illustrate one example of process for preparing the novel simple layered-type solid weld backing-up flux composition, as preparatory steps, the above-mentioned flux components are previously bonded together by a suitable bonding agent such as water glass to form a bonded flux block 3" having a desired viscosity while two pieces of glass fiber sheets 22 are prepared by weaving glass fibers or by arranging glass fibers into a bundle instead of weaving. One of the thus prepared glass fiber sheets 22 is first placed into a mold having desired depth, width and length and the bonded flux block 3" is then placed onto the glass fiber sheet 22. Thereafter, the other glass fiber sheet 22 is placed onto the flux block 3". The thus layered flux block 3" and glass fiber sheets 22 are then pressed together under a suitable pressure to a desired thickness and lastly solidified by heating or drying them.

In carrying out a one side welding operation employing the thus obtained layered or sandwiched-type solid weld backing-up flux composition, the layered backing-up flux composition is positioned in contact with the under-surfaces or back surfaces of work pieces such as steel plates 1 to be welded together covering the bottom of the beveling 2 formed between the steel plates and the one side welding operation is then carried out in the usual manner. In carrying out the welding operation, the layered or sandwiched-type solid weld backing-up flux composition 3" may be supported by any suitable copper hoop (not shown) or directly applied against and secured to the under-surfaces or back surfaces of the work pieces 1 by means of any suitable adhesive.

Figure 14:
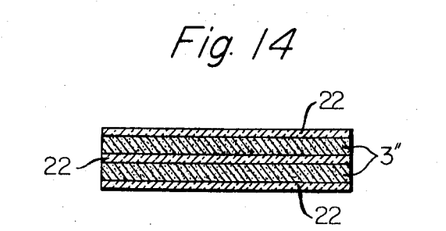
FIG. 14 is a cross-sectional view of a modified form of sandwiched type solid weld backing-up flux composition embodying the present invention.

FIG. 14 illustrates a rather complicated layered or sandwiched-type solid weld backing-up flux composition according to the present invention. This modified layered-type solid weld backing-up flux composition comprises the same bonded flux components 3" and glass fiber sheets 22 as employed in the embodiment of FIG. 13, and this modified backing-up flux composition is different from the simple layered-type solid weld backing-up flux composition of FIG. 13 only in the fact that one flux block 3" is sandwiched between the uppermost and intermediate glass fiber sheets 22 and the other flux block 3" is sandwiched between the intermediate and lowermost glass fiber sheets 22 so as to form a rather complicated multiple layered construction.

Figure 15:
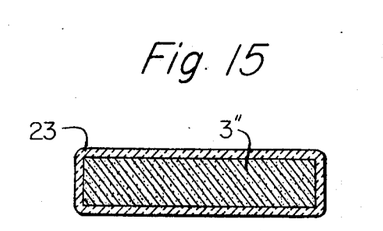
FIG. 15 is a cross-sectional view of a modified form of encased type solid weld backing-up flux composition embodying the present invention.

FIG. 15 illustrates a further modified form of enclosed-type solid weld backing-up flux composition in which all the sides of the same flux block 3" as those employed in the embodiments of FIGS. 13 and 14 are completely encircled by a rectangular section glass fiber enclosure member 23 of glass fiber which is the same in nature as those employed in the embodiments of FIGS. 13 and 14.

The solid weld backing-up flux compositions described in connection with FIGS. 13 through 15 have been found as having great higher tenacities than those of the conventional flux compositions which comprise the same solidified flux components, but do not contain metallic powders or powder. To demonstrate the superior performances of the novel weld backing-up flux compositions containing metallic powders or powder by the present invention, five specimens of the novel weld backing-up flux compositions were compared with five controls which have the same flux compositions, but do not contain metallic powders or powder by subjecting them to load tests in which they were applied loads thereon until they broke away down. The results of these load tests are shown in the following Table 1 (in each of these tests, the span was 200 mm. and load was applied at a midpoint between the extreme ends of the span).

TABLE 1.—RESULTS OF LOAD TESTS
[Unit=gram]

| No. | Controls | Novel compositions |
|---|---|---|
| 1 | 1.570 | 12.700 |
| 2 | 1.300 | 15.520 |
| 3 | 0.500 | 17.510 |
| 4 | 1.200 | 12.300 |
| 5 | 1.100 | 14.300 |

Furthermore, transporting endurance tests were performed on the novel solid weld backing-up flux compositions and controls having the same flux components and mixing ratios as those of the novel compositions, but do not contain metallic powders or powder (the denominators show the number of specimens tested and the numerators show the number of the broken specimens).

TABLE 2
Results of transporting endurance tests

| Controls | Novel compositions |
|---|---|
| 72/120 | 0/120 |

From the above Table 2, it will be seen that the novel solid weld backing-up flux compositions by the present invention are far less subject to breaking as compared with the conventional solid weld backing-up flux compositions during transportation thereof. And even if some cracks develop in the solidified flux compositions during a welding operation, the flux compositions will not come loose to fall off or out of their supporting means resulting in satisfactory welds.

Some typical compositions of the embodiments shown in FIGS. 13 through 15 comprise the following component materials having the specific blending ratios as shown in Table 3.

TABLE 3.—FLUX COMPOSITIONS
[By weight]

| Iron powders | Rutile | Lime-stone | Silica | Ferro-mangan | Fluo-rite | Bonding agent |
|---|---|---|---|---|---|---|
| 35 | 15 | 15 | 5 | 10 | 10 | 10 |
| 20 | 15 | 15 | 5 | 15 | 15 | 10 |
| 50 | 10 | 10 | 5 | | 15 | 10 |

In the compositions shown in the above Table 3, fluorite may be replaced by cryolite, and lime stone may be replaced by wollastonite. Such changes may not have any effect on the performances of the novel solid weld backing-up flux compositions.

As mentioned above, the novel solid weld backing-up flux compositions according to the present invention are different from the conventional solid weld backing-up flux compositions, which are prepared by merely mixing and solidifying the flux components together by the use of a bonding agent, in the fact that the novel solid flux compositions have metallic powders or powder within the range of 5–75% blended therein as mentioned above and their apparent porosity is within the range 25–60%.

Figure 7:
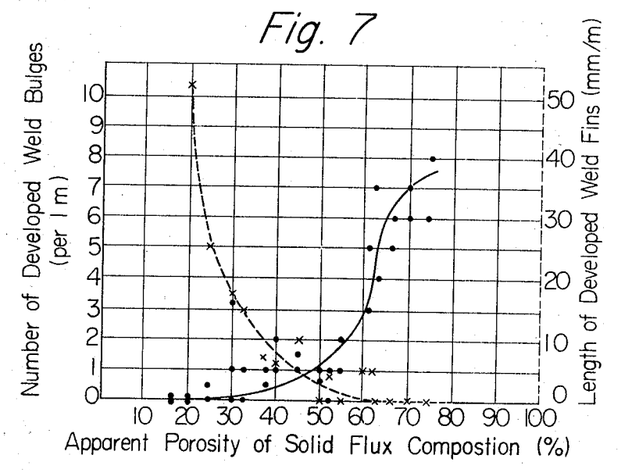
FIGS. 7 and 8 are graphs which show the effects which the apparent porosities of various solid weld backing-up flux compositions have obtained welds.

FIG. 7 graphically shows that the apparent porosity of a solid weld backing-up flux composition has an important influence on the frequency of occurrence of weld fins nd weld bulges.

As seen from this graph of FIG. 7, if a solid weld backing-up flux composition has an apparent porosity below 25%, weld fins frequently develop and if such weld fins occur to the degree that the solid weld backing-up flux composition fails to closely contact the surface of a work piece or pieces, such flux composition cannot be used as a backing-up flux composition in any one side welding operation. On the contrary, if the porosity of a solid weld backing-up flux composition is over 60%, the number of weld bulges which may come to appear on the surface of the back bead formed at the bottom of the welded beveling between work pieces will increase and give an ugly appearance to the bead surface. Some shapes of solid weld backing-up flux composition may give low degree of strength to the obtained welds and are not easy to handle. Therefore, it is necessary for a solid weld backing-up flux composition to have the apparent porosity within the range of from 25–60% so that the heat conductivity of the flux composition may be a suitable value, occurrence of spattering may be greatly reduced, dropping-off of deposited metal may be greatly reduced, premature flowing of molten metal may be prevented and proper cooling effects may be obtained. If the apparent porosity of a solid weld backing-up flux composition is below 25%, drawbacks such as undercuts may frequently appear on the opposite sides of the back bead.

Figure 8:
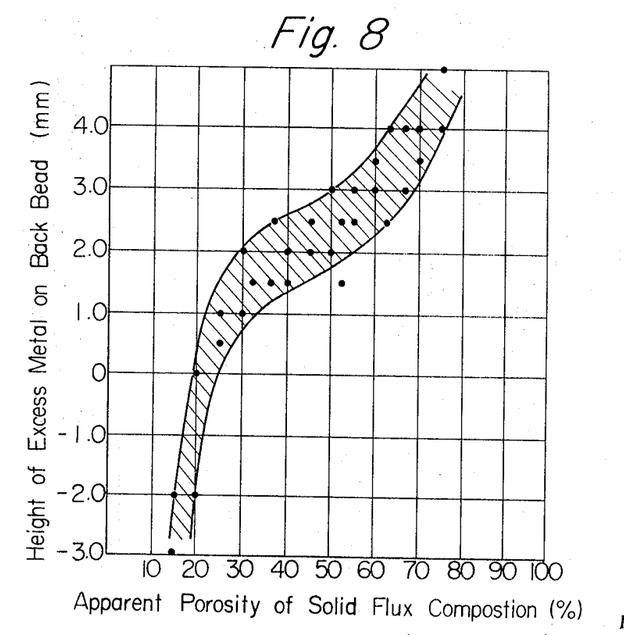

FIG. 8 graphically shows the measured heights of excess metals on the back beads formed by the use of various solid weld backing-up flux compositions having varying apparent porosities. The minus excess metals (below a predetermined excess metal level) are represented by the cave-in of the back beads and such minus excess metals are due to excessively low porosities, addition of metallic powders or powder in varying amounts less than the lower limit of 5% or excessively high refractoriness of solid weld backing-up flux compositions.

When metallic powders or powder as mentioned above within the range 5–75% are added to the conventional flux components, the apparent porosities of such flux compositions will become over 20% and there will be no occurrence of minus excess metal in any way.

On the contrary, if the apparent porosity of a solid weld backing-up flux composition exceeds 60%, the excess metal will become so high that further finishing work will be necessary to remove the amount of metal in excess of the predetermined excess metal level. This makes the welding operation more complicated and expensive.

In view of the above facts and reasons, it will be readily understood that in the present invention, the limitation of the apparent porosity of any of the novel solid weld backing-up flux compositions within the range of from 25% to 60% is very significant. According to the present invention, the principal purpose for addition of metallic powders or powder in the amount range as specified hereinabove to the principal flux components is not to improve the welding operation efficiency as in the conventional solid weld backing-up flux compositions, but to improve the appearance of formed back beads.

The addition of metallic powders or powder to the novel solid weld backing-up compositions within the above-specified range is for the reason that if the amount of metallic powders or powder is less than 4%, even if the apparent porosity is within the range from 25% to 60%, the shape of the back bead will be unsatisfactory, a portion of the back bead will have slag caught therein or the surface of back bead will be excessively uneven which will render the resultant weld impractical. On the contrary, when the amount of additive metallic powders or powder is over 75%, even if the apparent porosity is within the specified 25–60% range, the appearance of the obtained back bead will be so rough and uneven that the resultant weld cannot be practically employed; the back bead surface will not have a desired or necessary smoothness and will appear as if the solid weld backing-up flux composition has been firmly baked on the back bead.

The following Table 4 shows the results obtained through the experiments performed on various solid weld backing-up compositions which contain metallic powders or powder within the above-specified range from 5% to 75%, over or below the specified range and no metallic powders, respectively. The experiment results were obtained by using these solid weld backing-up compositions under the entirely uncovered condition as shown in FIG. 1 and in the manner as shown in FIG. 4.

TABLE 4.—RESULTS OF EXPERIMENTS MADE ON PERFORMANCES OF SOLID FLUX COMPOSITIONS

| Specimen No. | Principal flux components (weight parts) | | | | | Metallic powder (percent) | Apparent porosity (percent) | Evaluations of back beads | | | | | Conclusions |
|---|---|---|---|---|---|---|---|---|---|---|---|---|---|
| | SiO₂ | MnO | CaO | MgO | Al₂O₃ | | | Weld fins | Under-cuts | Slag caught in bead bulges | Deviation from pre-determined excess metal level | Bead appearance | |
| BF-1 | 54.2 | | 31.9 | 8.9 | 4.0 | 0 | 28 | X | X | X | ▲ | X | X |
| 2 | 25.2 | 9.0 | 12.6 | 13.5 | 20.7 | 10 | 31 | ○ | ▲ | ○ | ○ | ○ | ○ |
| 3 | 24.0 | 24.6 | 3.6 | 0.6 | 1.8 | 40 | 22 | ▲ | ▲ | ▲ | ○ | XX | ▲ |
| 4 | 10.9 | | 10.4 | 20.3 | 2.6 | 48 | 60 | ⊙ | ○ | ○ | ○ | ▲ | ○ |
| 5 | 38.0 | 6.8 | 25.4 | 12.3 | 11.5 | 0 | 79 | ⊙ | ○ | XX | X | ▲ | ▲ |
| 6 | 20.5 | | 9.8 | 33.0 | 6.2 | 11 | 38 | ⊙ | ⊙ | ○ | ○ | ▲ | ○ |
| 7 | 32.5 | 17.6 | 15.0 | 3.3 | 1.7 | 15 | 76 | ○ | ○ | ○ | X | ▲ | ▲ |
| 8 | 44.9 | 31.0 | 9.0 | 0.9 | 1.1 | 0 | 15 | XX | XX | ▲ | ○ | ▲ | XX |
| 9 | 38.0 | 31.2 | 0.8 | 6.9 | 2.9 | 0 | 35 | X | X | ○ | ○ | ▲ | X |
| 10 | 17.1 | 4.8 | 14.2 | 42.0 | | 5 | 60 | ○ | ○ | ⊙ | ○ | ▲ | ○ |
| 11 | 39.0 | 36.5 | 4.2 | 2.0 | 0.9 | 0 | 18 | X | ▲ | ○ | ○ | X | XX |
| 12 | 16.1 | 1.4 | 14.7 | 23.8 | 35.0 | 30 | 30 | ○ | ⊙ | ⊙ | ⊙ | ⊙ | ○ |
| 13 | 46.0 | 9.0 | 27.9 | 5.9 | 7.3 | 0 | 16 | XX | X | ▲ | ▲ | X | XX |
| 14 | 10.5 | | 10.0 | 20.0 | 2.5 | 50 | 32 | ⊙ | ○ | ○ | ○ | ▲ | ▲ |
| 15 | 32.0 | 9.4 | 4.7 | 17.8 | 20.7 | 6 | 19 | ▲ | ▲ | ○ | ○ | ▲ | ▲ |
| 16 | 7.6 | | 6.9 | 15.6 | 1.4 | 62 | 25 | ○ | ○ | ○ | ○ | ▲ | ○ |
| 17 | 19.8 | 8.4 | 23.5 | 14.0 | 20.2 | 0 | 20 | X | XX | ○ | XX | XX | XX |
| 18 | 6.0 | | 5.4 | 12.3 | 0.9 | 70 | 36 | ○ | ○ | ○ | ○ | ○ | ○ |
| 19 | 37.2 | 10.4 | 20.7 | 0.9 | 7.2 | 0 | 22 | XX | X | X | ○ | ○ | X |
| 20 | 17.2 | | 12.9 | 38.8 | 2.6 | 14 | 35 | ○ | ○ | ⊙ | ▲ | ⊙ | ⊙ |
| 21 | 6.8 | 6.0 | 1.6 | 1.9 | 2.0 | 80 | 22 | ○ | X | ○ | ▲ | XX | X |
| 22 | 16.8 | | 16.0 | 31.2 | 4.0 | 20 | 21 | ○ | ○ | ▲ | ⊙ | ▲ | ▲ |
| 23 | 32.9 | 23.1 | 14.2 | 7.4 | 13.3 | 0 | 43 | ○ | X | X | ○ | ▲ | X |
| 24 | 18.5 | 3.0 | 15.2 | 45.0 | | 0 | 26 | ▲ | ▲ | ○ | ○ | X | ▲ |
| 25 | 32.2 | | 34.9 | 19.3 | 10.1 | 0 | 38 | ○ | ▲ | ▲ | ○ | ▲ | ▲ |
| 26 | 11.6 | | 11.0 | 22.0 | | 45 | 35 | ⊙ | ⊙ | ⊙ | ⊙ | ○ | ⊙ |
| 27 | 32.5 | 14.0 | 9.3 | 8.3 | 6.5 | 7 | 23 | ○ | ▲ | ○ | ○ | X | ▲ |
| 28 | 6.8 | | 5.2 | 4.4 | 0.6 | 80 | 30 | ○ | ○ | ⊙ | ○ | XX | ▲ |
| 29 | 37.0 | 28.1 | 9.1 | 1.2 | 20.4 | 0 | 30 | ○ | X | X | X | ○ | X |
| 30 | 5.1 | | 5.0 | 10.0 | 0.5 | 75 | 25 | ○ | ○ | ⊙ | ○ | ▲ | ○ |

NOTE.—⊙=5, ○=4, ▲=3, X=2 and XX=1.

As seen from this Table 4, some of the solid weld backing-up flux compositions containing the conventional flux components, but not metallic powders or powder such as BF-1, 5, 8, 9, 11, 13, 17, 19, 23, 24, 25 and 29 have been found impractical for any one side welding operation, that is, as mentioned in "Evaluation Column" in the Table 4, the solid weld backing-up compositions containing no metallic powders give varying uneven surfaces to the obtained back beads and there are frequent occurrence of undercuts on the opposite sides of the back beads. Furthermore, in some cases, existence of slag caught in the back beads which are generally called as "slag entanglement" can be observed by means of external observations or X-ray transmission observations. The other of these no-metal powder containing solid weld backing-flux compositions will not form smooth back beads or if any, such flux compositions will not form back beads having smooth and arcuate cross sections, but form those having acutely angled cross section.

The following Table 5 shows the results of experiments made on the performances of various metal containing and non-metal containing solid weld backing-up flux compositions when they were employed in the shapes as shown in FIGS. 2 and 3, respectively.

TABLE 5.—RESULTS OF EXPERIMENTS MADE ON PERFORMANCES OF SOLID FLUX COMPOSITIONS

| | Principal flux components (percent) | | | | | Metallic powder (percent) | Apparent porosity (percent) | Evaluation of back beads | | | | | Conclusions |
|---|---|---|---|---|---|---|---|---|---|---|---|---|---|
| | Silica sand | Magnesia | Alumina | Fluorite | Others | | | Weld fins | Under-cuts | Slag caught in weld bulges | Deviation from pre-determined excess metal level | Bead appearance | |
| Specimen No.: | | | | | | | | | | | | | |
| CB-1 | | 50 | | 10 | | 40 | 35 | ⊙ | ⊙ | ⊙ | ▲ | ○ | ○ |
| 2 | 13 | | 60 | 7 | 20 | 30 | 41 | ⊙ | ⊙ | ⊙ | ○ | ⊙ | ⊙ |
| 3 | | 40 | | 20 | | 40 | 64 | ⊙ | ⊙ | ○ | XX | XX | X |
| 4 | 20 | 40 | | 10 | 25 | 7 | 60 | ○ | ○ | ○ | ▲ | ▲ | ○ |
| 5 | | 20 | | | | 80 | 25 | ○ | ○ | ○ | XX | X | X |
| 6 | 8 | 22 | 22 | 5 | 23 | 15 | 20 | XX | X | ⊙ | X | X | X |
| 7 | 10 | 28 | 24 | 16 | 22 | 0 | 27 | X | ▲ | ⊙ | X | XX | X |
| 8 | 15 | 8 | 2 | 4 | 59 | 12 | 53 | ○ | ○ | ○ | ▲ | ▲ | ○ |
| 9 | | | 30 | | | 70 | 25 | ○ | ○ | ○ | ▲ | ▲ | ○ |
| 10 | 9 | 14 | 7 | 1 | 19 | 50 | 68 | ○ | ○ | X | XX | XX | XX |
| 11 | 50 | | | | | 15 | 16 | ○ | X | ⊙ | X | ▲ | ▲ |
| 12 | 4 | 38 | | | | 20 | 38 | 12 | X | ○ | ⊙ | XX | ▲ | ▲ |

NOTE.—⊙=5, ○=4, ▲=3, X=2, XX=1.

As seen from this Table 5, it will be understood that in order to achieve desired heat conductivities and cooling effects of the solid weld backing-up flux compositions it is necessary to add metallic powders or powder in the amount within the range as specified above and flux compositions having refractorinesses and apparent porosities within proper ranges can be satisfactorily used. However, when these solid weld backing-up flux compositions are used in actual welding operations, it is necessary to restrict the properties of them by selecting the proper amount of additive metallic powders or powder and proper apparent porosity for these flux compositions within the specified ranges because the input heat amount, arc intensity and other conditions for welding operation may vary. And therefore, the above-specified amount metallic powders or powder, ranging from 25–60%, is most suitable for addition.

As described in connection with FIGS. 2, 3, 5 and 6 hereinabove, when a specific solid weld backing-up flux composition is placed in a light-weight shaped steel casing with at least one area the flux composition being exposed of and the exposed area being applied against lower-surfaces or back surfaces of work pieces to be joined together at the bottom area of the beveling formed between the work pieces and one side welding operation is then performed, the operation will be more convenient as compared with the conventional one side welding operations.

For preparing the solid weld backing-up flux composition as shown in FIG. 2, for example, a flux composition comprising the above-mentioned flux components and the above-mentioned metallic powders or powder which are bonded together by the above-mentioned bonding agent placed into a metallic casing as shown in FIG. 2 and having a predetermined length and then compressed under a pressure high enough to give the obtained product a porosity within the range of from 25% to 60%. Thereafter, the compressed product is placed in a suitable dryer where the product is dehydrated and solidified. Alternatively, the above flux composition is preliminarily made into a paste. Just before the thus prepared flux composition is used for an actual welding operation, the paste flux composition is placed into the metallic casing such as shown in FIG. 2 and molded under pressure in the manner mentioned just above. Thereafter, the compression molded flux composition is heated by a suitable gas burner, for example.

Thus, it will be understood that the novel solid weld backing-up compositions may be more advantageously used and have many applications over the prior art solid weld backing-up compositions comprising only the identical principal flux components. For example, when a field welding operation is carried out or a large structure is welded in which a solid weld backing-up composition assembly (including a metallic casing, a copper hoop and/or a flat supporting steel plate) is applied against the under-surfaces or back surfaces of work pieces to be welded together, any of the novel solid weld backing-up compositions may be more advantageously used over any of the conventional composite solid weld backing-up compositions. The same is true when shop-welding operation is carried out, that is, when a specific solid weld backing-up flux composition assembly (including a metallic casing, a steel plate and auxiliary devices) is previously laid down and work pieces to be welded together are placed on the weld backing-up flux composition assembly. Furthermore, by merely changing the shape of the solid weld backing-up compositions the novel solid weld backing-up compositions may be advantageously utilized for applications in which oppositely positioned steel plates are butt-welded in an aligned relation, work pieces are fillet-welded and work pieces are welded together into an angular structure. For example, when the solid flux composition is placed in a suitable metallic rip angle steel casing with two surfaces thereof being exposed, the encased solid weld backing flux composition can be applied for a one side fillet welding of work pieces to be joined at right angles to each other. And for one side welding of work pieces laid flat, work pieces having curved surfaces and work pieces of circular sections, the novel composite solid weld backing-up compositions may be easily used by merely changing their solidified shape depending upon the configurations of the work pieces to be welded together. And thus, the novel composite solid weld backing-up compositions have a great variety of applications.

The following are examples of the novel composite solid weld backing-up flux compositions.

EXAMPLE 1

40 parts of magnesia, 6 parts of alumina, 8 parts of fluorite, 13 parts of limestone, 6 parts of wollastonite, 15 parts of silica sand, 13 parts of metallic powders (6 parts of manganese iron and 7 parts of silicon iron), 1.5 parts of chrome oxide as coloring agent were bonded together by adding 14 parts of water glass to the above component materials and molded under a pressure within the range of from 15–20 kg./cm.$^2$ so as to form a solid weld backing-up flux composition having the apparent porosity within the range of from 30–40%. The obtained solid weld backing-up flux composition had the thickness of 5 mm. and width of 30 mm. and a length corresponding to the length of the metal to be welded. When the thus obtained solid weld backing-up flux composition was used in a one side welding operation, a very satisfactory back bead could be obtained. In this composition, the addition or elimination of the coloring agent such as chrome oxide had no influence on the properties of the obtained back bead.

EXAMPLE 2

7 parts of alumina, 7 parts of limestone, 26 parts of silica sand, 10 parts of manganese iron, 30 parts of rutile were bonded together by adding 10 parts of water glass to the flux component materials and compression molded under a pressure within the range of from 80–95 kg./cm.² so as to form a brick-like solid weld backing-up flux composition having the apparent porosity within the range of from 25–28%. The obtained solid weld backing-up flux composition had the thickness of 40 mm., width of 60 mm. and length of 300 mm. The brick-like solid weld backing-up flux composition was placed in a preformed open top iron casing. The solid flux composition in the metallic casing was held against the lower-surface or back surfaces of work pieces by tack-welding the free edges of the casing and one side welding operation was then carried out. The weld backing flux composition was satisfactorily deposited on the work pieces due to the thermal contraction of the tack-weld back bead and the welding results were very satisfactory.

EXAMPLE 3

27 parts of magnesia, 4 parts of alumina, 5 parts of fluorite, 8 parts of limestone, 4 parts of wollastonite, 10 parts of manganese iron, 5.5 parts of silicon iron and parts of mangansee iron, 5.5 parts of silicon iron and 35 parts of iron powder) were mixed together with 10 parts of water glass and 1% of an organic matter and molded under suitable pressure followed by calcination thereby forming a solid weld backing-up flux composition having an apparent porosity within the range 55–60%. The obtained solid weld backing-up flux composition had a thickness of 2 mm., width of 50 mm. and length of 50 mm. A plurality of the thus formed solid flux composition blocks or bricks were arranged side by side on and secured to one side of a length of Japanese paper by means of a suitable adhesive. The paper supported solid flux composition blocks were held against the lower-surfaces or back surfaces of work pieces with the support of a copper hoop and one side welding operation was then carried out. A very satisfactory back bead was obtained. This type of embodiment was very practical because the same can be cut to any desired length depending upon the size of weld to be formed. In the embodiment of Example 3, the organic matter may be high molecular organic material such as starch. The only requirements are that the flux composition contain 5–75% of metallic powders as well as the ordinary flux components with addition of a bonding agent such as water glass and is capable of being compression molded so as to give an apparent porosity within the range 25–60% to the obtained flux composition. The thus formed solid weld backing-up flux composition can be used equally well in conjunction with a strip of organic material such as Japanese paper or a sheet of fibrous material such as glass fiber sheet.

EXAMPLE 4

70 parts of alumina and 30 parts of metallic powders (17 parts of iron powder, 8 parts of silicon iron and 5 parts of manganese iron) were bonded together by means of 8–15 parts of non-moisture absorbing linseed oil as the bonding agent so as to form a mortar state flux composition. The mortar state flux composition was placed in an equilateral triangular steel casing of 50 mm. x 50 mm. x 4 mm. just before the same is used for its intended purpose and compression molded under a pressure sufficient to give the apparent porosity of 25–60% to the obtained flux composition. The thus obtained flux composition was solidified by means of a gas burner. When used in one side welding operation the solid flux composition produced the same effects as mentioned in connections with the preceding examples of compositions. If this type of solid flux composition is employed for welding in conjunction with any suitable reinforcing means such as a length of wire, a hoop or a wire mesh, the strength of the composite solid weld backing-up flux composition will be increased and the same will be easily handled.

While several embodiments of the invention have been shown and described in detail it will be understood that they are for the purpose of illustration only and are not to be taken as a definition of the scope of the invention, reference being had for this purpose to the appended claims.

What is claimed is:

1. In a solid weld backing-up flux composition having in combination welding flux components, said flux components consisting essentially of inorganic oxides selected from the group consisting essentially of silicone dioxide, aluminum oxide, calcium oxide and barium oxide or minerals containing these inorganic oxides; metallic carbonates selected from the group consisting essentially of calcium carbonate, barium carbonate and magnesium carbonate or minerals containing these metallic carbonates; and an inorganic fluoride or fluoride selected from the group consisting essentially of calcium, fluoride or minerals containing such fluoride or fluorides; the improvement wherein said backing-up flux composition further consists of 5–75% by weight ratio of metallic powder admixed with said welding flux components and the mixture is compression molded with a bonding agent added thereto so as to have a porosity within the range of 25–60% and a desired shape.

2. A solid weld backing-up flux composition as claimed in claim 1, consisting of, by weight ratio, 40 parts of magnesia, 6 parts of alumina, 8 parts of fluorite, 13 parts of lime stone, 6 parts of wollastonite and 15 parts of silica sand, 6 parts of manganese iron powder and 7 parts of silicon iron powder, and said mixture being bonded together by 14 parts of water glass.

3. A solid weld backing-up flux composition as claimed in claim 2, further consisting of chrome oxide as coloring agent and having an apparent porosity within the range 30–40% which is obtained by subjecting the composition to pressure of 15–20 kg./cm.² during the compressing molding of the same.

References Cited

UNITED STATES PATENTS 3,413,163   11/1968   Hillert _______________ 148—26

L. DEWAYNE RUTLEDGE, Primary Examiner

W. W. STALLARD, Assistant Examiner

U.S. Cl. X.R.

148—26